(12) United States Patent
Shurtleff et al.

(10) Patent No.: US 10,860,335 B1
(45) Date of Patent: Dec. 8, 2020

(54) NETWORK CONFIGURATION INTERFACE SYSTEM AND METHOD

(71) Applicant: Cisco Technology, Inc., San Jose, CA (US)

(72) Inventors: Mark Shurtleff, Hayward, CA (US); Alon Bernstein, Monte Sereno, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 381 days.

(21) Appl. No.: 15/279,458

(22) Filed: Sep. 29, 2016

(51) Int. Cl.
*G06F 9/445* (2018.01)
*G06F 3/0482* (2013.01)
*G06F 3/0481* (2013.01)
*G06F 3/0486* (2013.01)
*H04L 12/24* (2006.01)
*G06F 8/60* (2018.01)
*G06F 8/65* (2018.01)

(52) U.S. Cl.
CPC ........ *G06F 9/44505* (2013.01); *G06F 3/0482* (2013.01); *G06F 3/0486* (2013.01); *G06F 3/04817* (2013.01); *G06F 8/60* (2013.01); *G06F 8/65* (2013.01); *H04L 41/0803* (2013.01); *H04L 41/0893* (2013.01)

(58) Field of Classification Search
CPC ........... G06F 9/44505; G06F 8/60; G06F 8/65
See application file for complete search history.

(56) References Cited

U.S. PATENT DOCUMENTS

| 5,742,286 | A | * | 4/1998 | Kung | ............ G06F 3/0486 715/733 |
|---|---|---|---|---|---|
| 5,819,042 | A | | 10/1998 | Hansen | |
| 6,259,448 | B1 | | 7/2001 | McNally et al. | |
| 6,456,306 | B1 | * | 9/2002 | Chin | ............ H04L 41/0213 709/224 |
| 6,915,514 | B1 | * | 7/2005 | Machida | ............ G06F 9/4411 717/168 |
| 7,017,124 | B2 | | 3/2006 | Jaeger | |
| 7,979,854 | B1 | * | 7/2011 | Borole | ............ G06F 8/65 717/172 |
| 8,200,796 | B1 | * | 6/2012 | Margulis | ............ G06F 3/1438 709/223 |

(Continued)

OTHER PUBLICATIONS

A/B Testing the Complete Guide by https://vwo.com/ab-testing/ as of Apr. 9, 2013 (Year: 2013).*

(Continued)

*Primary Examiner* — William L Bashore
*Assistant Examiner* — Nathan K Shrewsbury
(74) *Attorney, Agent, or Firm* — Polsinelli PC

(57) ABSTRACT

In one embodiment, a catalog of items for deployment is provided, the catalog comprising at least one catalog item, the at least one catalog item represented as an icon in a graphical user interface (GUI). At least one remote PHY device (RPD) represented in the GUI as an icon for populating with one item from the catalog of items is also provided. The at least one catalog item is associated with the at least one RPD using an interface in the GUI. A deployment mechanism is invoked for deploying the at least one catalog item at the at least one RPD with which the icon representing the at least one RPD has been populated. Related systems, apparatus, and methods are also disclosed.

20 Claims, 7 Drawing Sheets

(56) References Cited

U.S. PATENT DOCUMENTS

| | | | | |
|---|---|---|---|---|
| 8,291,324 B2* | 10/2012 | Battat | G06F 3/04817 | 715/736 |
| 8,560,951 B1 | 10/2013 | Snyder et al. | | |
| 9,374,278 B2* | 6/2016 | Gao | H04L 41/085 | |
| 9,497,092 B2* | 11/2016 | Gomez | G06F 3/04817 | |
| 9,916,068 B1* | 3/2018 | Bell | G06F 11/0772 | |
| 10,019,133 B1* | 7/2018 | McNeill | H04L 67/36 | |
| 2003/0035010 A1* | 2/2003 | Kodosky | G05B 19/0426 | 715/771 |
| 2004/0148184 A1* | 7/2004 | Sadiq | G06F 9/44505 | 717/171 |
| 2007/0169093 A1* | 7/2007 | Logan | H04W 12/0023 | 717/168 |
| 2007/0174834 A1* | 7/2007 | Purkeypile | G06F 8/63 | 717/174 |
| 2007/0234302 A1* | 10/2007 | Suzuki | G06F 8/61 | 717/126 |
| 2007/0245333 A1* | 10/2007 | Ferlitsch | G06F 8/65 | 717/168 |
| 2008/0070495 A1* | 3/2008 | Stricklen | H04W 8/22 | 455/3.01 |
| 2008/0185432 A1* | 8/2008 | Caballero | G06F 11/3093 | 235/435 |
| 2009/0019152 A1* | 1/2009 | Huang | H04L 67/125 | 709/224 |
| 2009/0300179 A1* | 12/2009 | Srinivasan | H04N 21/26291 | 709/225 |
| 2010/0043068 A1* | 2/2010 | Varadhan | H04L 12/4633 | 726/15 |
| 2011/0138310 A1* | 6/2011 | Gomez | H04L 41/082 | 715/769 |
| 2011/0185355 A1* | 7/2011 | Chawla | G06F 9/5077 | 718/1 |
| 2011/0228750 A1* | 9/2011 | Tomici | H04W 8/082 | 370/338 |
| 2012/0110572 A1* | 5/2012 | Kodi | G06F 9/5027 | 718/1 |
| 2013/0310017 A1* | 11/2013 | Elkady | H04W 4/50 | 455/419 |
| 2015/0074661 A1* | 3/2015 | Kothari | H04L 49/557 | 718/1 |
| 2015/0212812 A1* | 7/2015 | Tripathi | G06F 9/44505 | 717/120 |
| 2017/0012903 A1* | 1/2017 | Matzek | H04L 49/15 | |
| 2017/0024353 A1* | 1/2017 | Bhatia | G06F 9/44505 | |
| 2017/0060628 A1* | 3/2017 | Tarasuk-Levin | G06F 9/45558 | |

OTHER PUBLICATIONS

The Apple Remote Desktop Administrator's Guide Version 3 Apple Computers (Year: 2006).*

R. Xie, Y. Wen, X. Jia and H. Xie, "Supporting Seamless Virtual Machine Migration via Named Data Networking in Cloud Data Center," in IEEE Transactions on Parallel and Distributed Systems, vol. 26, No. 12, pp. 3485-3497, Dec. 1, 2015, doi: 10.1109/TPDS. 2014.2377119. (Year: 2015).*

Open-Source Routing and Network Simulation; Open-Source Network Simulators—Latest News; available on the web at: http://www.brianlinkletter.com/open-source-network-simulators/; Jul. 4, 2016.

Open Network Laboratory; A Resource for Networking Researchers and Educators available on the web at: https://onl.wustl.edu/intro-onl; Jul. 10, 2016.

What is Cisco Remote-PHY Solution; available on the web at: http://www.cisco.com/c/en/us/td/docs/cable/RemotePhy/solution/b-remote-phy-overview.html; Aug. 1, 2014.

Wiseman, Charlie et al; "A Remotely Accessible Network Processor-Based Router for Network Experimentation"; in Proceedings of ANCS Nov. 6, 2008.

* cited by examiner

… (1) …

NETWORK CONFIGURATION INTERFACE SYSTEM AND METHOD

TECHNICAL FIELD

The present disclosure generally relates to graphical user interfaces (GUIs) for managing and configuring remote physical layer circuits.

BACKGROUND

Network management configuration requires deployment of a "set" of several file "types" of various complexity that must be "matched" to ensure proper network operations. In this "set" are: CLI (command line interface) files containing hundreds to thousands of lines of commands, policy files containing hundreds of lines of settings, and the base operating system having compatible file versions and patches. By way of example, in cable television network configurations these files are created and managed as valid configuration "sets" or "packages" by experts with many years of training in network management. A complete network management configuration requires versioning and management of these "sets" or "packages": CLI configuration, policy, and virtual machine (VM) configurations and optimal operating system, which has to be compatible with the set and packages.

Managing individual files is cumbersome and error prone. It is typically preferable to encapsulate sets of configuration files that belong together into a "catalog" package, which acts as a container for the files that "belong together". In current practice these files are managed by scripts and third party versioning tools such as CVS (Concurrent Versions System), an open source version control system. Organizing presenting and managing "packages" as real objects displayed in a responsive web GUI greatly simplifies the current practice of using home grown scripts and third party versioning tools. By way of example, because specific configuration files are relevant to a particular software release, the software binary can be also part of the package. For administration purpose a user may want to add documentation or bug reports to the catalog package.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

In one embodiment, a catalog of items for deployment is provided, the catalog comprising at least one catalog item, the at least one catalog item represented as an icon in a graphical user interface (GUI). At least one remote PHY device (RPD) represented in the GUI as an icon for populating with one item from the catalog of items is also provided. The at least one catalog item is associated with the at least one RPD using an interface in the GUI. A deployment mechanism is invoked for deploying the at least one catalog item at the at least one RPD with which the icon representing the at least one RPD has been populated. Related systems, apparatus, and methods are also disclosed.

Exemplary Embodiment

Figure 1:
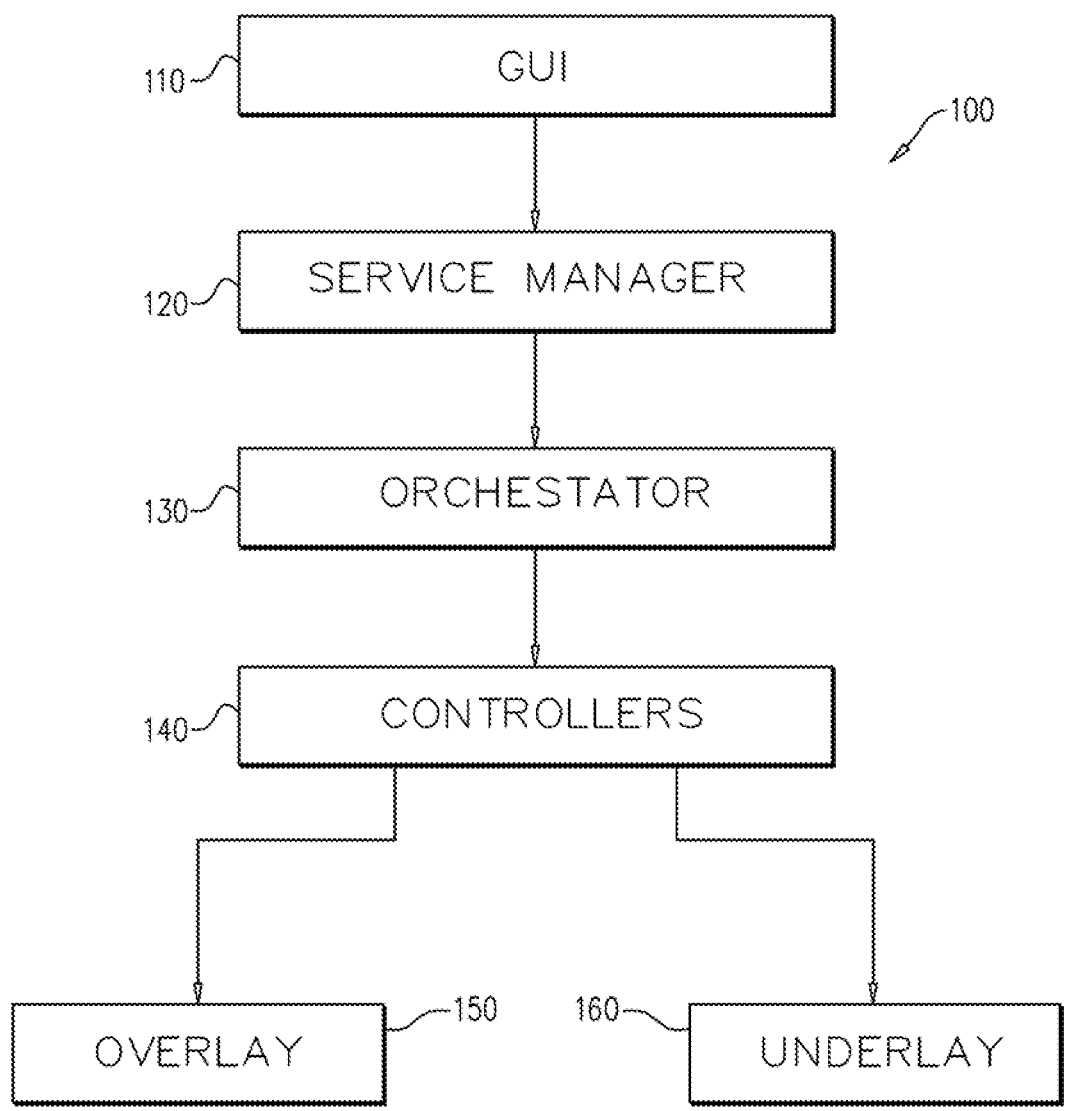
FIG. 1 is a simplified block diagram illustration of a layered network configuration interface constructed and operative in accordance with an embodiment of the present invention.

Reference is now made to FIG. 1, which is a simplified block diagram illustration of a layered network configuration interface 100 constructed and operative in accordance with an embodiment of the present invention.

The following terms will be used throughout the present disclosure and claims.

PHY is an abbreviation for the physical layer of the OSI model (i.e., the Open Systems Interconnection model) and refers to the circuitry required to implement physical layer functions. A PHY connects a link layer device (often called "MAC" as an abbreviation for media access control) to a physical medium such as an optical fiber or copper cable.

Remote PHY refers to a technique whereby a PHY circuit is moved out of a device such as a CCAP (Converged Cable Access Platform) and instead put at the end of a network.

In embodiments of the layered network configuration interface 100 system and method described herein, a user utilizes a GUI 110 in order to select a catalog and then to drag and drop the catalog over an icon representing one or more of a plurality of Remote PHY Devices (RPDs). The catalog and the RPDs will be discussed below in greater detail. Accordingly, since the RPD has been moved out of the local device and has instead been put at the end of the network, the user of the GUI 110 is able to manipulate the RPD without being in the same physical location as the RPD. Additionally, the use of the GUI 110 enables the user of the GUI 110 to focus on executing his or her goals, rather than enter data reflecting the RPD they wish the affect (e.g., the IP address of the RPD).

Many systems offer visual representations of "containers" that are represented in graphical user interfaces for general data center purposes. The layered network configuration interface 100, however, allows for graphical interaction of blocks for "actions" as well as configuration "workflows".

The GUI 110 serves as an interface to a service manager 120. The service manager receives the actions performed by the user utilizing the GUI 110 and determines how to match a particular RPD with a specific core—regardless of the type of service being managed by the service manager 120, as will be described below. Note that at the GUI 110 level, the user does not associate a specific RPD to a specific core, but rather, at the GUI 110 level, the user the user focuses on the service. That is to say, the user focuses on what the service needs to be provisioned with, and not how the service gets provisioned.

It is appreciated that the discussion herein of the service may refer, by way of a non-limiting example, to any of the following technology areas:

Cable television—i.e., cable remote PHY connected to either a CMTS (cable modem termination system), EQAM (edge QAM modulator), out-of-band cores (any of which can be virtual or physical);

Satellite television—i.e. a link between a particular satellite and an RPD at a particular base station, gateway, or network headend;

Wifi access point—where an RPD is connected to wireless LAN controller (virtual or physical);

Mobile base stations—where an RPD is connected to packet core (virtual or physical);

DSLAM (i.e. a Digital Subscriber Line Access Multiplexer)—where an RPD is connected to a BRAS (broadband remote access server) (virtual or physical); and OLT (optical network terminator)—where an RPD is connected to a BRAS (virtual or physical).

The service manager 120 creates a specific service to be associated with the remote PHY and the core, either virtual or physical. The GUI 110 passes a reference to the service manager 120, as will be described below, with reference to an application programming interface associated with the GUI. The service manager 120 then breaks the passed reference into its associated components. The breaking down of the reference passed from the GUI 110 to the service manager 120 by the service manager 120 is predicated on the catalog, which was dragged and dropped over one or more of the plurality of RPDs having been previously populated at the time the catalog was created, as will be described below, with reference to FIG. 4. The service manager 120 operates in the layered network configuration interface 100 system as an application of the GUI 110.

An orchestrator 130 manages workflow, enabling deploying components in the catalog in a certain order. For example, a virtual machine may need to be created first, and then a configuration file can be pushed to the virtual machine only after the virtual machine is created. In the event of a failure, the orchestrator 130 should be operative to rollover and/or rollback the system to a point where the workflow can be resumed. The orchestrator 130 operates in the layered network configuration interface 100 system as a network management layer.

A controller 140 comprises actual physical elements, wherein the controllers 140 operate as an element management layer. The controller layer 140 is associated with the overlay 150 which enables connecting two distinct IP endpoints, regardless of their underlying network topology and connectivity. The control layer 140 is also associated with an underlay 160 which is a physical network. In the case of an RPD and its core (i.e. two distinct IP endpoints to be connected), an IP address is assigned to the connection, while ensuring that the network topology (i.e., the underlay 160) has enough bandwidth to support the connectivity.

The catalog may be used in different versions in order to assist the user in managing a complex matrix of:

Scanning an RPD at a warehouse;
Software versions;
Configuration templates;
Virtual machines—e.g., number of CPUs, amount of disk space, amount of RAM, etc.;
Availability policies;
And so forth. That is to say that, when the user completes the process of configuring the RPD using the GUI 110, the RPD is then enabled for a particular service according to an assigned catalog item which includes the configuration files is assigned to the assigned catalog item.

Figure 2:
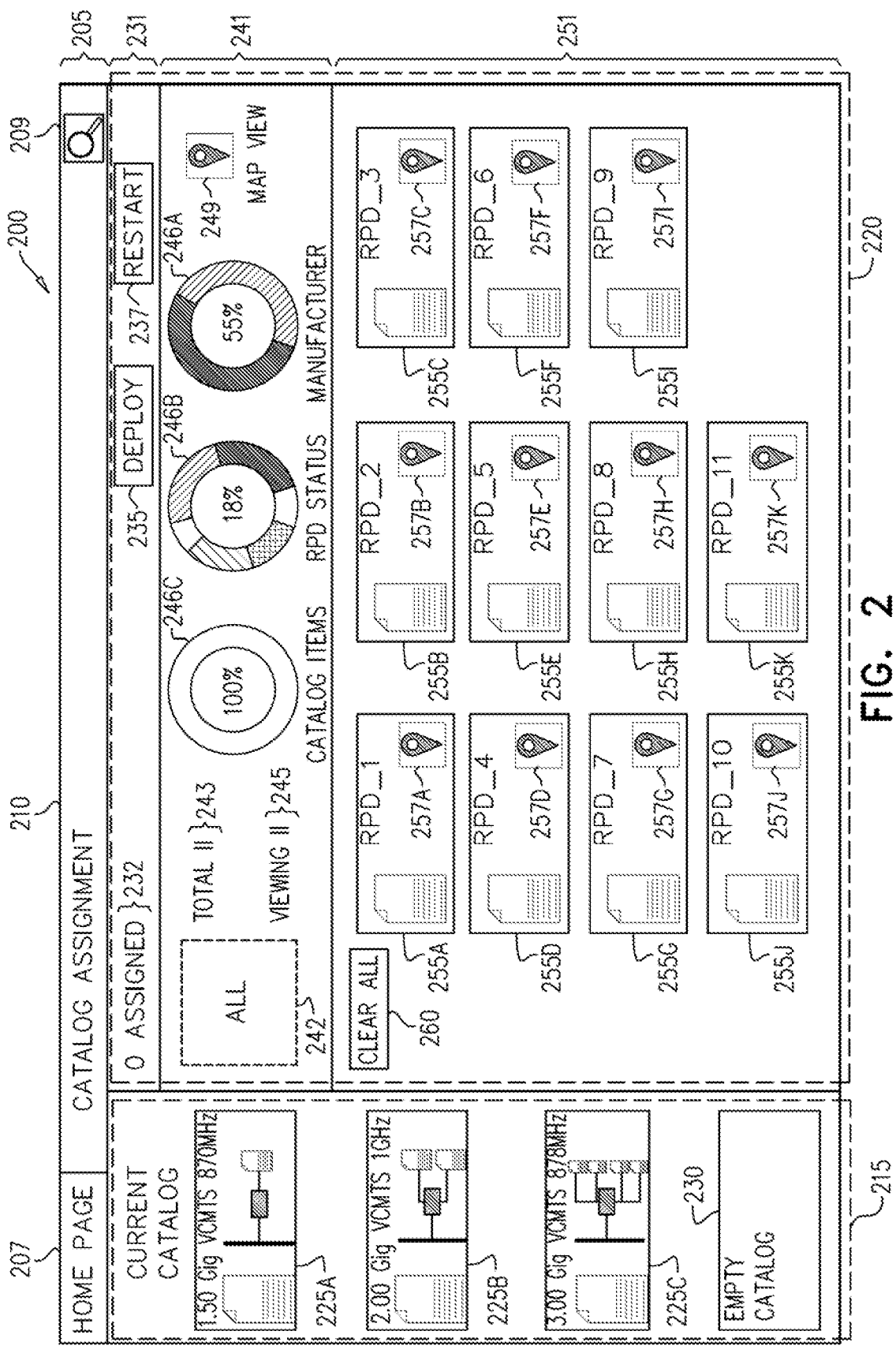
FIG. 2 is a simplified pictorial illustration of a GUI which may be used in the layered network configuration interface system of FIG. 1.

Reference is now made to FIG. 2, which is a simplified pictorial illustration of a GUI 200, such as GUI 110 (FIG. 1), which may be used in the layered network configuration interface 100 system of FIG. 1. The GUI 200 of FIG. 2 has three main portions: a title bar 205, a current catalog pane 215, and an assignment pane 220. The title bar 205 has a home page button 207 enabling returning to a home page. The title bar 205 also has a search control 209, enabling executing a search function from the present page. Additionally, the title bar 205 displays a page title 210, in the present case, "Catalog Assignment".

The current catalog pane 215 has a variety of graphical elements which represent a variety of icons representing different items 225A, 225B, 225C, described briefly below, and an "Empty Catalog" catalog item 230, which can be used to clear all assigned items, as will be described below. Each of the icons representing different catalog items 225A, 225B, 225C may, as will be discussed further below, be associated with a remote PHY object. By way of example, in the depiction of the GUI 200 of FIG. 2, the different catalog items 225A, 225B, 225C as depicted as various different types of virtual cable modem termination systems (VCMTS), each one of which has a capacity (e.g. 1.50 Gig; 2.00 Gig; and 3.00 Gig) and an associated frequency spectrum (e.g., 870 MHz; 1 GHz; 878 MHz). It is appreciated, however, that the examples in FIG. 2 are purely by way of illustration, and are mentioned here in an exemplary fashion. As was already noted, the embodiments described herein are not to be understood to be limited to any particular example. As such, even though FIG. 2 illustrates an embodiment which is relevant in the realm of cable television headends, in point of fact, any other service, such as those mentioned above, may be used in other embodiments.

As was noted above, catalog items may be any one of a number of items requiring management. Accordingly, although the catalog items mentioned in the present example pertain to different types of virtual machines, where at least one catalog item comprises one version of the virtual machine, other catalog items may refer to different software versions of the same item, where at least one catalog item comprises one version of the software item; different configuration templates of the same item, where at least one catalog item comprises one version of the configuration template; other catalog items may refer to different system policy files, where the at least one catalog item comprises one version of the system policy file; and so forth. Since different software versions of the same item may be associated with different catalog items, in some embodiments, software upgrades may be performed by using the GUI 200, by changing one catalog item assigned to an RPD to another catalog item with a different software version. It is further appreciated that by using the catalog system described herein to assign one catalog item, such as a first version of software to a first group, and using the catalog system described herein to assign a second catalog item, such as a second version of software to a second group, the catalog system may be used with the GUI 200 to perform A|B testing in order to compare the first and second versions of the software.

The assignment pane 220 of GUI 200 will now be discussed. An upper portion 231 of the assignment pane 220 has a "Number Assigned" Tag 232, which indicates the number of catalog items assigned to RPDs (RPD). At present, the number is indicated as being 0. Additionally, there is a Deploy button 235, which can be used at the end of a process of assigning catalog items (such as catalog items 225A, 225B, 225C) to various RPDs to commit changes which were made. There is also a Restart button 237, which can be used to restart the process of assigning catalog items to RPDs.

A middle portion 241 of the assignment pane 220 has an "ALL" box 242, which can be used to assign one particular type of catalog item (i.e. any one of catalog items 225A, 225B, 225C) to all available RPDs.

A Total tag 243 indicates the total number of RPDs available for assignment in the GUI 200. A Viewing tag 245 indicates the number of RPDs viewed in the present window. Where the total number of RPDs exceeds the total number of RPDs viewed in the GUI 200, the non-viewed RPDs may be made viewable either by scrolling to a non-displayed portion of the GUI 200, or by accessing a different GUI window. In the present example, the total number of RPDs available for assignment, and the total number of RPDs displayed in the GUI 200 are both 11. Various donut graphs 246A, 246B, 246C may indicate a number of data items of interest. By way of example, one donut graph 246A may represent various manufacturers (e.g. one graph may indicated different available components per manufacturer); one donut graph 246B may represent an operational status (e.g., up, down, or in progress). Another donut graph 246C may indicate a number of different software releases in use in the various catalog items. A map view button 249 enables opening up a map display showing the physical locations of the RPDs, as will be briefly described below, with reference to FIG. 3.

A bottom portion 251 of the assignment pane 220 shows, in the present example, that 11 RPDs (RPD_1, RPD_2, . . . , RPD_11) 255A-255K are available for population with catalog items, such as catalog items 225A, 225B, 225C. Each one of the 11 RPDs 255A-255K also has a map view icon 257A-257K, enabling viewing the physical location of the particular RPD on a map (described below, with reference to FIG. 3). A clear all button 260 enables removing all filter rules which may be implemented in configuring the GUI 200 display.

It is appreciated that the GUI 200 may enable a wide variety of operations which are outside of the scope of the present specification. For example, double clicking on a populated RPD may enable viewing additional information about the RPD, such as health, network status, serial number, redundancy status, temperature, configuration information, and so forth. Additionally, as mentioned above, vis-à-vis map view button 249 and map view icons 257A-257K, the physical locations of the various RPDs 255A-255K can be seen on a map. Similarly, a search icon 209 may appear on the GUI 200, as will be discussed below.

Figure 3:
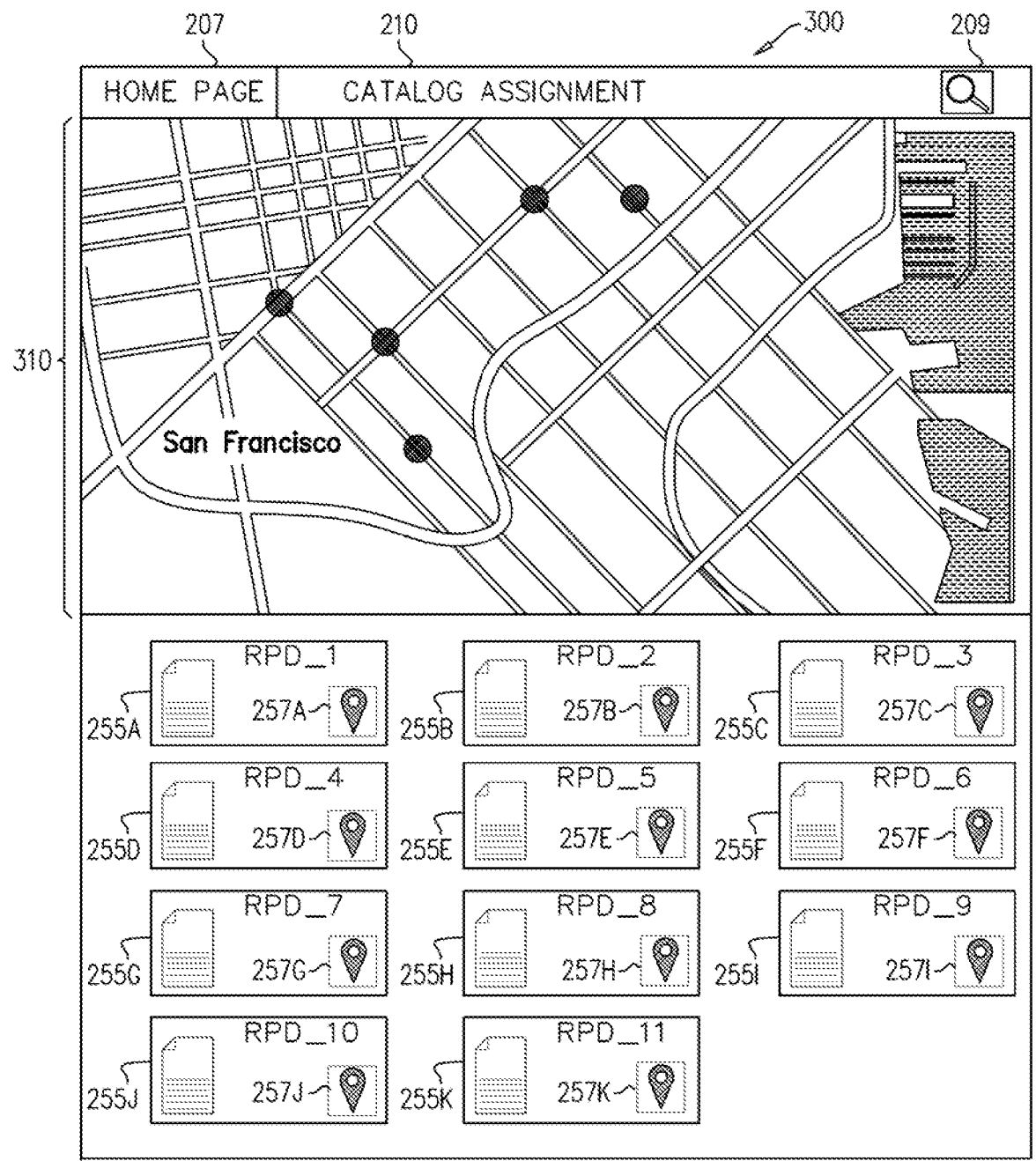
FIG. 3 is a simplified pictorial illustration of map view in a child GUI of the GUI of FIG. 2.

Reference now is made to FIG. 3, which is a simplified pictorial illustration of map view in a child GUI 300 of the GUI 200 of FIG. 2. One exemplary use of the GUI 200 of FIG. 2 would be to view the map view child window 300, as is shown in FIG. 3. When clicking on one of the map view buttons 249, 257A-257K depicted in FIG. 2, a map 310 appears in child GUI 300 showing the physical location of the RPDs 255A-255K. By double clicking on an icon associated with one of the RPDs 255A-255K in the child GUI 300, the physical location of the RPD associated with the icon which was double clicked will appear at the center of the map 310.

It is appreciated in the present discussion of the GUI 200 (FIG. 2) and child GUI 300 that various features which appear or are described are depicted or described by way of example, and in some embodiments may not appear or behave as depicted or as described herein. By way of one example, the search feature which is indicated by search icon 209 may not, in some embodiments, appear on every GUI window. Similarly, the search icon 209 may be physically located in an entirely different location in some embodiments than the location in which it is depicted in the present figures. Likewise, graphical elements, such as the icons appearing in the depiction of catalog items 225A, 225B, 225C, may be different in embodiments, or may be entirely absent from a particular embodiment.

Figure 4:
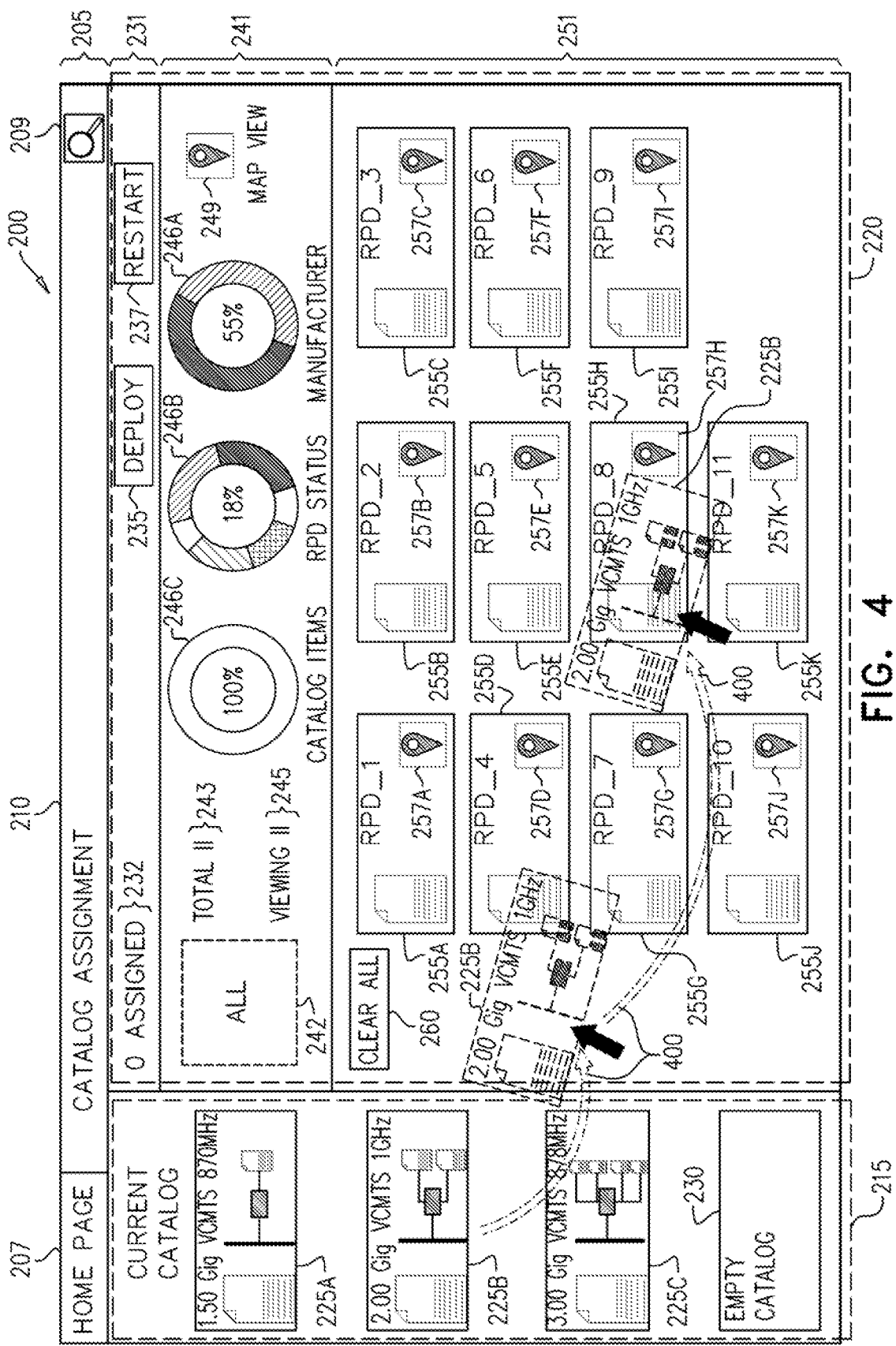
FIG. 4 is a simplified pictorial illustration of one operation performed using the GUI of FIG. 2 as a layered network configuration interface.

Reference is now made to FIG. 4, which is a simplified pictorial illustration of one operation performed using the GUI 200 of FIG. 2 as a layered network configuration interface. By way of example, an icon for one of the catalog items 225B is dragged and dropped 400 onto one of the an icon associated with one of the RPDs 255E.

Figure 5:
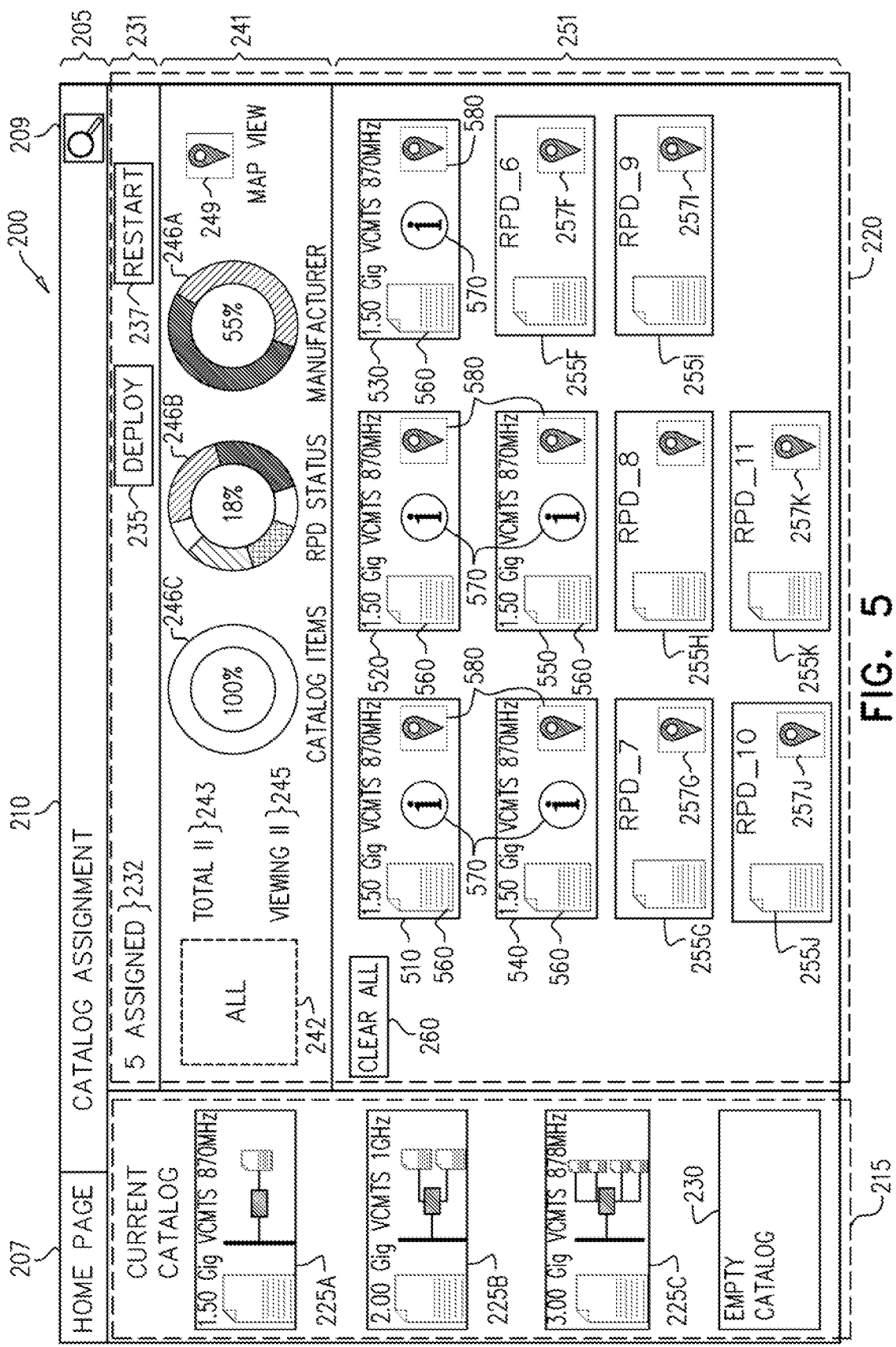
FIG. 5 is a simplified pictorial illustration of a stage in the use of the GUI of FIG. 2 as the layered network configuration interface where several of the RPD icons (as explained below) are populated with catalog items.

Before turning to the description in FIG. 5 of the consequence of the drag and drop operation of FIG. 4, two special cases remain may now be discussed, with additional reference to FIG. 2. The "Empty Catalog" catalog item 230 may be dragged to the "ALL" box 242 in order to remove all assigned catalog items (such as catalog items 225A, 225B, 225C) from their respective associated RPD 255A-255K.

Additionally, dragging one particular catalog item, for example, catalog item 225B to the "ALL" box 242 will populate all of the RPDs 255A-255K with catalog item 225B.

Reference is now made to FIG. 5, which is a simplified pictorial illustration of a stage in the use of the GUI 200 of FIG. 2 as the layered network configuration interface 100 of FIG. 1, where several of the RPD icons are populated with catalog items. At this stage, five of the icons are now depicted as associated with the RPDs 255A-E (FIG. 2). Accordingly, RPDs 255A-E (FIG. 2) have been populated with icons for one or another of the catalog items 225A-225C (FIG. 2). These five populated RPDs associated with the catalog items are now designated as item numbers 510, 520, 530, 540, and 550. The "Number Assigned" Tag, 232, now indicates that the number of catalog items assigned to RPDs is five.

Each of the five items 510, 520, 530, 540, and 550 are depicted with a graphical element, such as, by way of example, graphical element 560. Graphical element 560 might vary depending on what its associated catalog item (such as one of catalog items 225A-C) is. Furthermore, if the status of the item might be indicated in any graphical manner known in the art (e.g., change of color, displaying an icon, etc.). By way of example, when the 1.5 Gig VCMTS 870 MHz virtual machine 510 associated with RPD 225A is functioning correctly, the graphical element 560 associated with the 1.5 Gig VCMTS 870 MHz virtual machine 510 may be displayed in a green color. However, if, for some reason, the when the 1.5 Gig VCMTS 870 MHz virtual machine 510 associated with RPD 225A is no longer able to functioning correctly, the color might switch from green to yellow or red, indicating the severity of a problem. Additionally or alternatively, an icon, such as a "!" (not depicted) or an "X" (not depicted) might appear over or in proximity to the graphical element 560, indicating the severity of a problem.

An information icon 570 might be available, so that clicking on the information icon 570 will provide information pertaining to its associated item, e.g. items 510, 520, 530, 540, and 550. The map view icon 580 might also appear, enabling displaying the physical location of the RPD associated with the item 510, 520, 530, 540, and 550.

Figure 6:
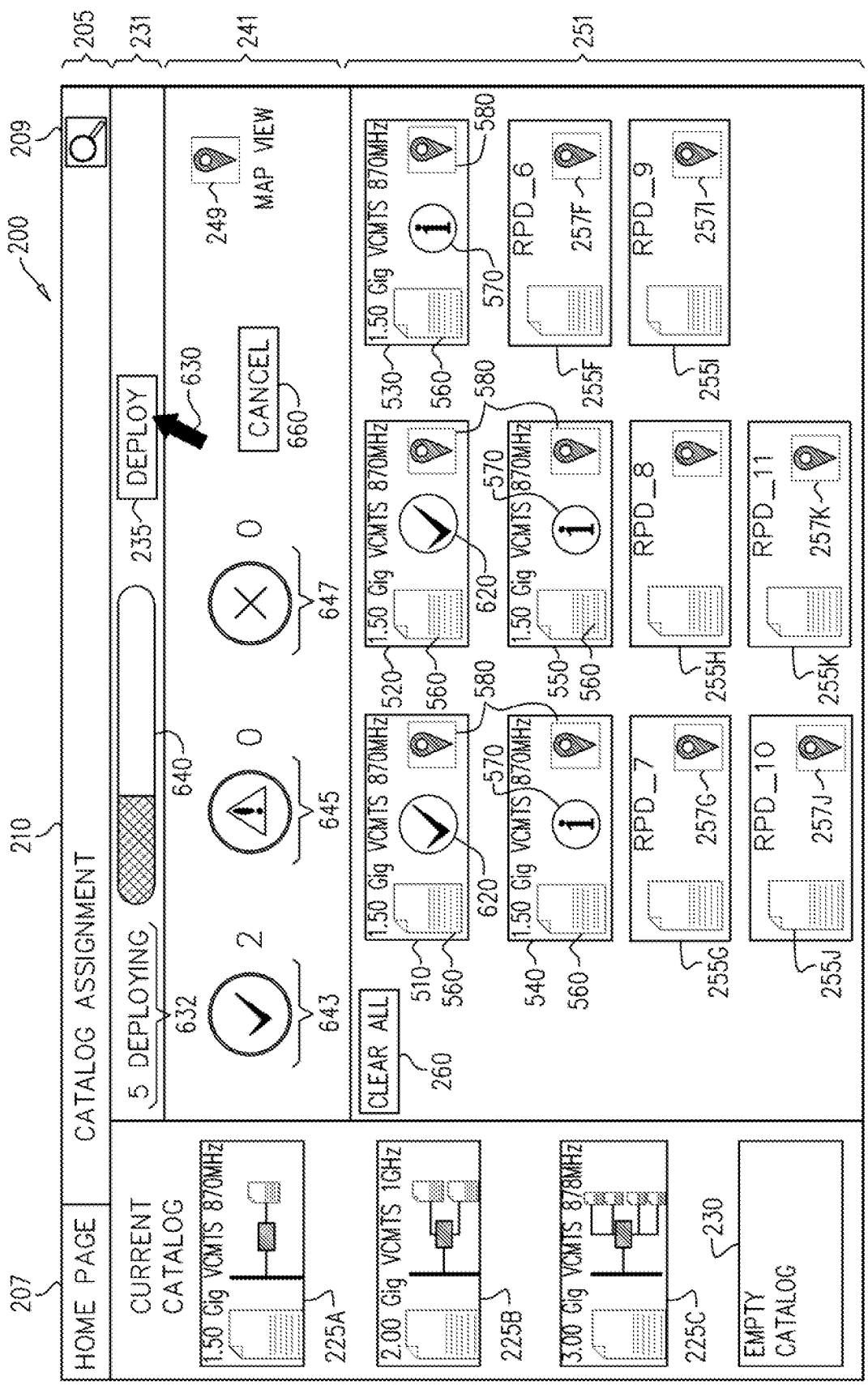
FIG. 6 is a simplified pictorial illustration of deploying catalog items to their associated RPDs using the GUI of FIG. 2.

Reference is now made to FIG. 6, which is a simplified pictorial illustration of deploying catalog items to their associated RPDs using the GUI of FIG. 2. The upper portion 231 of the assignment pane 220 now displays a cursor 630 indicating that the Deploy button 235 has been pressed, and the catalog items 225A-C which have earlier been assigned to the various RPDs 255A-E, are now in the process of being deployed—i.e. committed to their various RPDs 255A-E. The "Number Assigned" Tag 232 of FIG. 2 now displays as a "Number Deploying" tag 632, indicating that 5 items are actually deploying to their respective RPDs 255A-E. A progress bar 640 indicates the progress of the deployment. Items 510 and 520 display a check mark 620, indicating that they have already been deployed.

The middle portion 241 of the assignment pane 220 now displays three icons, indicating the status of the deployment. A first icon 643, depicted as a check mark, indicated successful deployment. In the case depicted in FIG. 6, two items are depicted as have been already successfully deployed. The two items depicted as have been already successfully deployed correspond to the two items 510 and 520 display a check mark 620. A second icon 645, depicted as a triangle with an exclamation point (similar to a traffic "yield sign") indicates that no items at present have deployment issues requiring intervention. A third icon 647, depicted as an "X", indicates that no items have failed in their deployment. A cancel button 660 enables terminating the deployment of the items deploying to their respective RPDs 255A-E.

It is appreciated that the GUI 200 of FIG. 2, as described herein may have an associated application programming interface (API). For example, associating a catalog item, such as catalog item 225C (FIG. 2) with a particular RPD, such as RPD 255J (FIG. 2) may invoke a call to the API which will affect the desired association. For example, in the case of cable television virtual machines being assigned to RPDs, as in the example provided in the description of FIG. 2, an API call may be invoked such as:

```
POST /restconf/config/cable-catalog:cable-service-
catalog/v1/service-association/<rpd-uuid> HTTP/1.1
Request:
{
   "cable-service-profile":
      {
         "name": "RPD_STANDARD"
      }
}
```

Those of skill in the art will appreciate that other appropriate API calls might be invoked in order to affect the RPD changes to be deployed using the GUI 200 of FIG. 2

Figure 7:
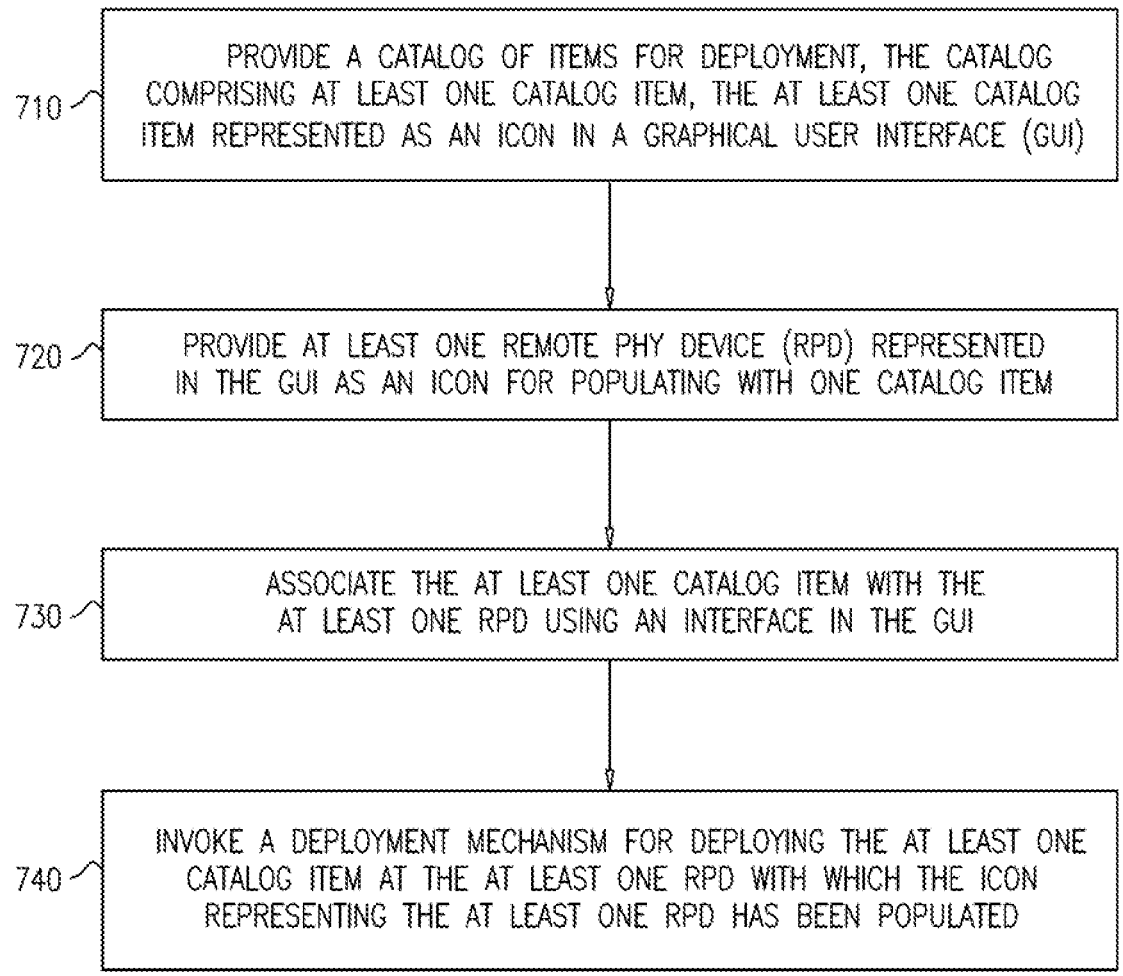
FIG. 7 is a simplified flow chart diagram of a method for an embodiment of the layered network configuration interface of FIG. 1.

Reference is now made to FIG. 7, which is a simplified flow chart diagram of a method for an embodiment of the layered network configuration interface of FIG. 1. At step 710 a catalog of items for deployment is provided to the GUI 200 of FIG. 2. The catalog comprises at least one catalog item, the at least one catalog item represented as an icon in the GUI 200 of FIG. 2. At step 720, at least one RPD is provided and represented in the GUI as an icon. The icon representing the at least one RPD is appropriate for populating with one catalog item (i.e. the one catalog item may be "assigned" to the RPD), such as the at least one catalog items of step 710. At step 730, the at least one catalog item (of step 710) is associated with the at least one RPD (of step 720) using an interface in the GUI 200 of FIG. 2. Finally, at step 740, a deployment mechanism is invoked for deploying the at least one catalog item (of step 710) at the at least one RPD (of step 720) with which the icon representing the at least one RPD has been populated.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A system comprising:
   a catalog of items for deployment, the catalog of items comprising at least one catalog item represented as a first icon via a graphical user interface (GUI), wherein the catalog of items includes at least one type of virtual machine;
   at least one remote physical layer functional device (RFD) represented as a second icon, via the GUI, for populating with the at least one catalog item, wherein the at least one RPD is physically remote from the GUI and a location of the at least one RPD is displayed on a map via the GUI;
   an interface in the GUI by which the at least one catalog item is associated with the at least one RFD;
   a deployment mechanism that, when invoked, causes the at least one catalog item to deploy at the at least one RPD; and
   in response to the deployment, the second icon is updated to indicate that the at least one RPD has been populated with the at least one catalog item and a status of the at least one RFD.

2. The system according to claim 1, wherein the interface comprises a drag and drop interface.

3. The system according to claim 1, wherein the at least one catalog item comprises one version of a software item.

4. The system according to claim 1, wherein the at least one catalog item comprises one version of a configuration template.

5. The system according to claim 1, wherein the at least one catalog item comprises one version of a virtual machine.

6. The system according to claim 1, wherein the at least one catalog item comprises one version of a system policy file.

7. The system according to claim 1, wherein the RPD comprises a cable television RPD.

8. The system according to claim 7, wherein the cable television RPD comprises one of a cable modem termination system, an edge QAM modulator, or an out-of-band core.

9. The system according to claim 1, wherein the RPD comprises a satellite television RPD.

10. The system according to claim 1, wherein the RPD comprises a Wifi access point.

11. The system according to claim 10, wherein the Wifi access point is connected to a wireless LAN controller.

12. The system according to claim 1, wherein the RPD comprises a mobile base station.

13. The system according to claim 12, wherein the mobile base station is connected to a packet core.

14. The system according to claim 1, wherein the RPD comprises a Digital Subscriber Line Access Multiplexer (DSLAM).

15. The system according to claim 14, wherein the DSLAM is connected to a broadband remote access server.

16. The system according to claim 1, wherein the RPD comprises an optical network terminator (OLT).

17. The system according to claim 16, wherein the OLT is connected to a broadband remote access server.

18. The system according to claim 1, wherein the deployment mechanism is invoked by an application programming interface (API).

19. The system according to claim 1, wherein,
   the catalog of items comprises two different versions of the at least one catalog item,
   the deployment mechanism deploys a first version of the at least one catalog item to a first RPD and a second version of the at least one catalog item to a second RPD, and
   A|B testing of the first version and the second version of the at least one catalog item is performed following deployment.

20. A method comprising:

providing a catalog of items for deployment, the catalog of items comprising at least one catalog item represented as a first icon via a graphical user interface (GUI), wherein the catalog of items includes at least one type of virtual machine;

providing at least one remote physical layer functional device (RPD) represented as a second icon via the GUI for populating with the at least one catalog item, wherein the at least one RPD is physically remote from the GU and a location of the at least one RPD is displayed on a map via the GUI;

associating the at least one catalog item with the at least one RPD using an interface in the GUI;

providing a deployment mechanism that, when invoked, cases the at least one catalog item to deploy at the at least one RPD; and in response to the deployment, the second icon is updated to represent that the at least one RPD has been populated with the at least one catalog item and a status of the at least one RPD.

* * * * *